United States Patent
Svensson

(10) Patent No.: US 6,178,960 B1
(45) Date of Patent: Jan. 30, 2001

(54) HAND-HELD MOTOR-DRIVEN SAW

(75) Inventor: Anders Svensson, Huskvarna (SE)

(73) Assignee: Hagby Asahi AB, Nora (SE)

( * ) Notice: Under 35 U.S.C. 154(b), the term of this patent shall be extended for 0 days.

(21) Appl. No.: 09/210,660

(22) Filed: Dec. 14, 1998

Related U.S. Application Data

(63) Continuation of application No. PCT/SE97/01074, filed on Jun. 17, 1997.

(30) Foreign Application Priority Data

Jun. 17, 1996 (SE) .................................................. 9602371

(51) Int. Cl.[7] ........................................................ B28D 1/08
(52) U.S. Cl. ................................ 125/21; 30/381; 451/355
(58) Field of Search .................... 83/830, 661; 30/381, 30/382, 123.4, 166.3, 380; 125/21, 16.02; 451/296, 355

(56) References Cited

U.S. PATENT DOCUMENTS

| | | |
|---|---|---|
| 3,958,332 | 5/1976 | Gates et al. . |
| 4,271,738 | 6/1981 | Deangelis . |
| 4,580,545 * | 4/1986 | Dorsten .................... 125/21 |
| 4,654,972 | 4/1987 | Sellmaier et al. . |
| 4,793,232 * | 12/1988 | Villemin et al. ............ 83/830 |
| 4,856,490 * | 8/1989 | Kawase et al. ............. 125/21 |
| 4,907,564 | 3/1990 | Sowa et al. . |
| 5,086,751 * | 2/1992 | Pfister et al. .............. 125/21 |
| 5,216,999 * | 6/1993 | Han .......................... 125/21 |
| 5,218,949 * | 6/1993 | Tomlinson et al. ......... 125/21 |

FOREIGN PATENT DOCUMENTS

| | | |
|---|---|---|
| 3411283 | 8/1984 | (DE) . |
| 3811265 | 10/1989 | (DE) . |

OTHER PUBLICATIONS

Patent Abstract Of Japan, vol. 14, No. 499, (M–1042) re JP–A–2–205410, Aug. 1990.

* cited by examiner

Primary Examiner—Rinaldi I. Rada
Assistant Examiner—Kim Ngoc Tran
(74) Attorney, Agent, or Firm—Pillsbury Madison & Sutro LLP

(57) ABSTRACT

A motor saw for cutting wood or stone includes a continuous wire loop (18) which carries uniformly-spaced cutting elements (25) and which is tensioned over a saw guide bar (17), from a drive wheel (30) mounted in the machine housing (15) to a loop-guiding sprocket wheel (20) at the outer end of the guide bar (17), said sprocket wheel functioning as a circular saw. As the cutting elements (25) pass over the sprocket wheel (20), they drop into recesses (28) between cog-like sprockets (27) thereon. The sprockets (27) support and guide the wire loop with the cutting elements (25) hanging freely in cutting positions in the recesses (28) between the sprockets. In the case of a duplicated wire loop, a cog claim (51) on the sprockets penetrates between parts (18', 18") of the loop so as to prevent the freely-hanging cutting elements (25) from twisting. These cutting elements may be irregularly shaped if desired. Given an enlarged diameter, the guide sprocket wheel (20') with the aid of the guide bar (17) attains an enhanced circular-saw effect to a depth that passes beyond the center of the guide sprocket wheel (20').

10 Claims, 4 Drawing Sheets

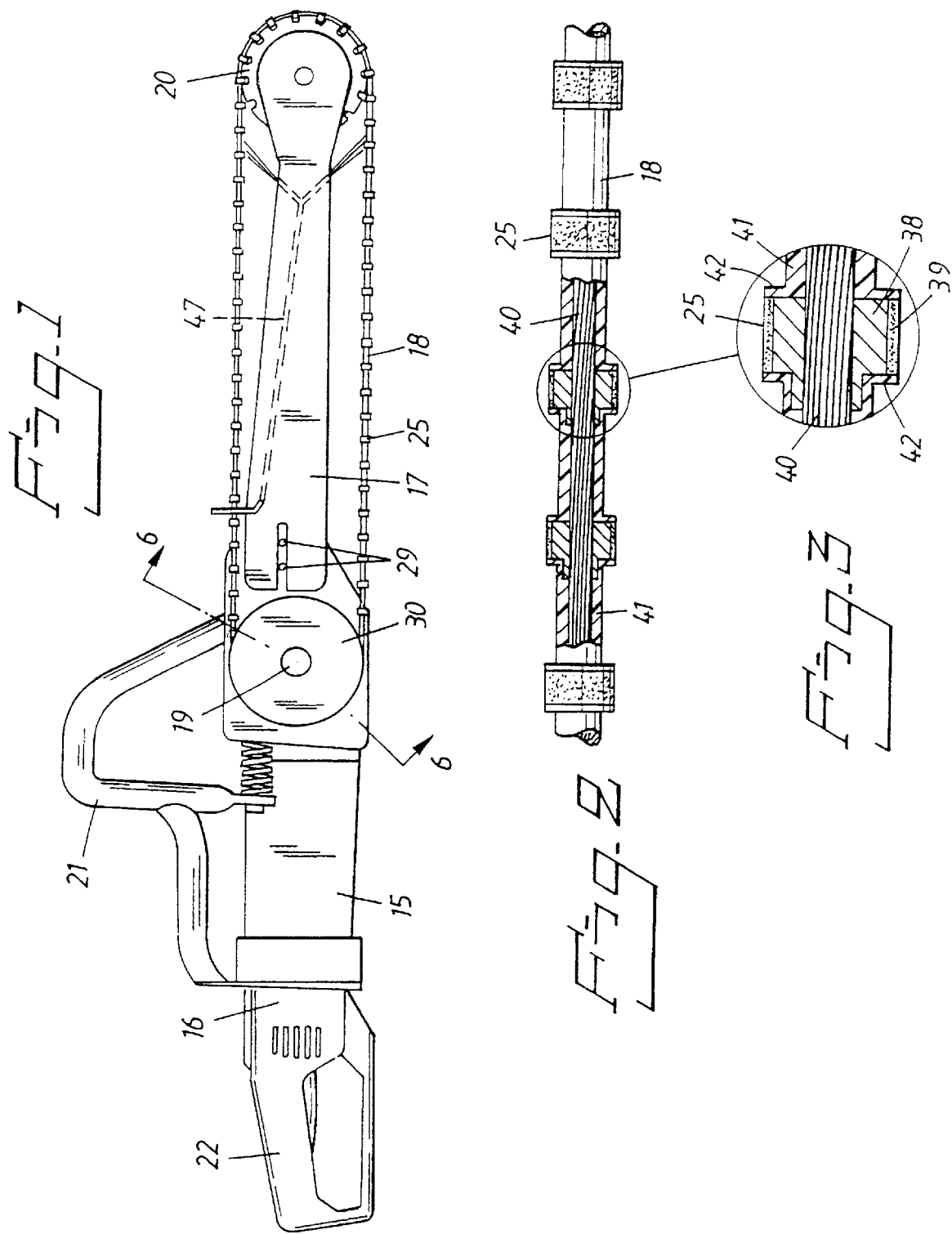

HAND-HELD MOTOR-DRIVEN SAW

This is a Continuation of International Appln. No. PCT/SE97/01074 filed Jun. 17, 1997 which designated the U.S.

The present invention relates to hand-held motor-driven saws of the kind comprising a machine housing with a handle, a drive motor, and a saw guide bar, in which the saw guide bar projects out from the machine housing and a continuous wire loop, which carries axially spaced cutting elements thereon, is arranged to run around the saw guide bar between a drive wheel in the drive motor and a loop-guiding sprocket wheel at the free end of the saw guide bar, the cutting width of the cutting elements being greater than the width of the saw guide bar and of the guide sprocket wheel.

RELATED ART

Portable power saws of this kind normally include belt-like elements in the form of chains comprised of mutually pivotal links that are guided in the longitudinal direction of guides on the saw guide bar. Examples of such saws are found in patent publications WO 88/04602 (EP A 293.399) and U.S. Pat. No. 4,654,972. Despite constructing the chain guides from special material or sawing with a free-hanging chain run as suggested in these publications, the problem of wear is still critical at least in that part of the saw guide bar most subjected to strain, namely in the guide sprocket wheels at the outer ends of the bars. When sawing stone, the stone debris that is generated becomes mixed with water and forms a sticky abrasive mass that quickly wears down joints and the surfaces of metal guides. When sawing wood, the wood cut repeatedly becomes clogged with sawdust, causing disturbances in the work on hand. This latter problem can be counteracted with the use of oil, although such use creates an environmental problem instead.

Patent Publications U.S. Pat. No. 4,907,564 and U.S. Pat. No. 3,958,332 disclose examples of sawing stone and wood with the use of band-type elements other than linked saw chains, namely continuous wire loops on which cutting elements are mounted. Available wire or cable constructions, however, require the use of mechanical equipment when cutting stone, often heavy equipment, which does not allow the portable power saw to be used in a typical comfortable manner, with plunging penetration of the guide sprocket wheel directly into stone or wood in the manner of a circular saw.

SUMMARY OF THE INVENTION

The object of the present invention is to provide a portable power saw that includes a wire loop which carries cutting elements and which coacts with a guide sprocket wheel on the saw guide bar in a manner such as to enhance the wear strength and increase the useful life of the saw by virtue of improving the exclusion of debris cuttings and wood dust and chips, so that straight-in plunge cuts can be made effectively in the material being cut with the aid of the guide sprocket wheel, in the manner of a circular saw. A further object is to enable such a straight-in cut to be made to a depth that extends beyond the centre of the guide sprocket wheel with the aid of an enlarged guide sprocket wheel, therewith achieving with simple saw guide bar equipment a working method that has hitherto been reserved for ring saws with high tool costs. Another object is to provide a wire saw that can be provided with cutting elements having a directed abrasive or cutting effect without the cutting elements twisting as the wire loop runs around the saw guide bar. These objects are achieved with an inventive motor saw that has the characteristic features set forth in the following claims.

BRIEF DESCRIPTION OF THE DRAWINGS

The invention will now be described in more detail with reference to the accompanying drawings, in which FIG. 1 is a side view of a first embodiment of an inventive power saw;

FIG. 2 illustrates in larger scale part of a stone-sawing wire loop according to the embodiment shown in FIG. 1;

FIG. 3 is an enlarged view of part of the wire loop shown in FIG. 2 and shows the loop carrying a cutting element;

DETAILED DESCRIPTION OF THE EMBODIMENTS

The machine housing 15 of the power saw shown in FIG. 1 includes a conventional drive motor 16 of an appropriate kind (not described in detail), such as an hydraulic motor, an electric motor or an internal combustion motor, said motor including an output shaft 19 which carries a drive wheel 30.

Figure 5:
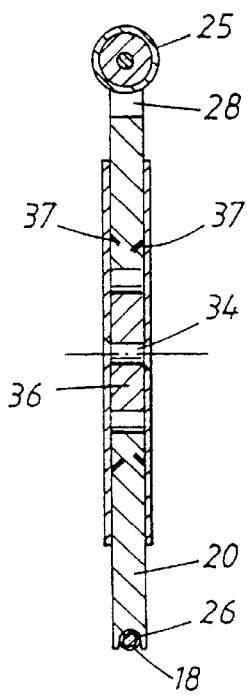
FIG. 5 is a sectional view taken on the line 5—5 through the front end of the saw guide bar and through the guide sprocket wheel shown in FIG. 4.

The machine housing 15 includes a handle 21, 22 for handling the saw manually. A saw guide bar 17 extends out from the machine housing 15 and is secured thereto by means of suitable bolts 29. The outer end of the saw guide bar 17 carries a guide sprocket wheel 20 which is rotatable about a shaft 34 mounted in a bearing 36 (FIG. 5). By means of sealing rings 37 the guide sprocket wheel 20 is sealed radially against respective sides of the saw guide bar 17 which grip around the guide sprocket wheel 20 and the bearing 36 in a fork-like manner.

An endless band-element carrying cutting elements 25 and having the form of a closed wire loop 18 is tensioned to orbit around the drive wheel 30 and the guide sprocket wheel 20. The machine housing 15, in the region of the bolts 29, is let in conventional manner associated with means, not shown, which keep the wire loop 18 taut against the drive wheel 30 and against the guide sprocket wheel 20 during revolving motion. A preferred embodiment of the wire loop 18 for use when sawing stone, concrete and brick is shown in FIGS. 2, 3. In this embodiment, circular-cylindrical, steel carrier cores 38 are fixed in uniform spaced relationship along the length of the wire loop 18 on a wire 40 comprised of twisted steel or plastic strands (e.g. Kevlar™) . Each of the cores 38 carries a stone-cutting abrasive layer 39, e.g. a layer that includes diamond powder or boron nitride in a suitably applied matrix material; in respect of examples of material compare publication U.S. Pat. No. 4,907,564 mentioned hereinbefore by way of introduction. The wire 40 is covered with a suitable chip-repelling elastomeric casing 41 between the cores 38 of the cutting elements 25, said elastomeric casing having mutually opposing end-flanges 42 which abut against the ends of the cutting elements 25, i.e. the cores 38.

Figure 4:
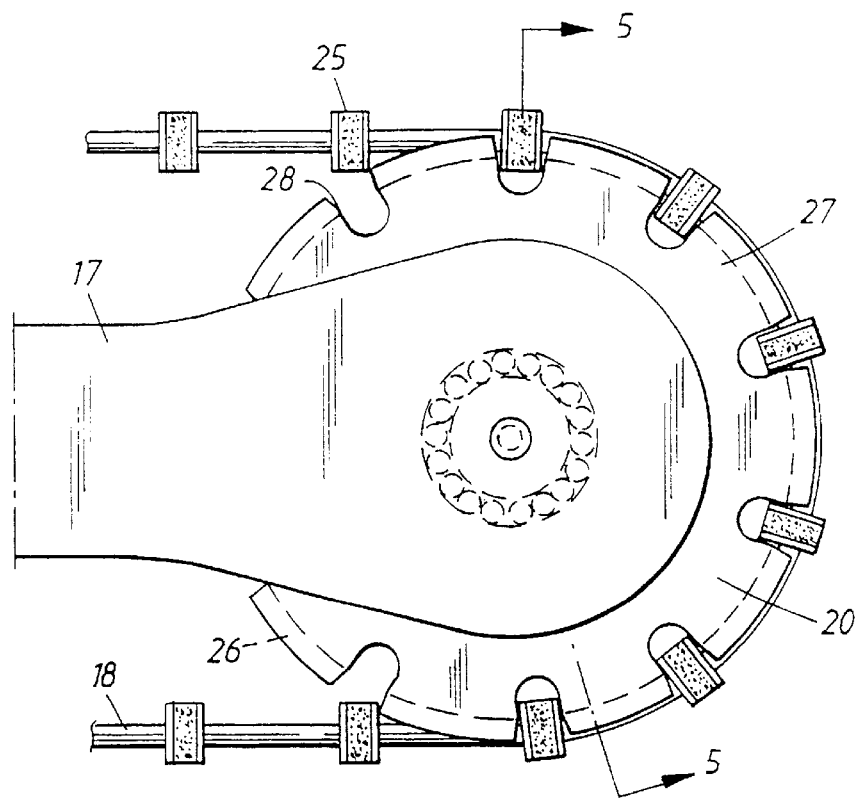
FIG. 4 is an enlarged view of the front end of the saw guide bar shown in FIG. 1.
Figure 6:
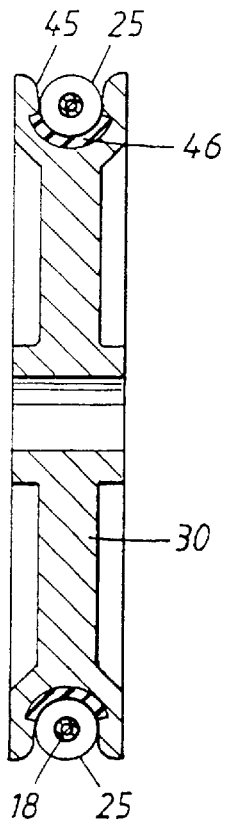
FIG. 6 is an enlarged sectional view taken on the line 6—6 through the drive wheel of the saw shown in FIG. 1.

As will be seen from FIG. 6, the drive wheel 30 has a circumferential groove 45 which receives the wire loop 18 and the bottom of which has an elastomeric lining 46 which protects the bottom of the groove against wear in its driving cooperation with the cutting elements 25. Instead of lining the groove, the drive wheel 30 can be protected against wear by constructing the drive wheel in a manner analogous with the guide sprocket wheel 20 as described hereinafter with reference to FIGS. 4, 5.

As the wire loop 18 runs over the guide sprocket wheel 20, it coacts with guide means on the periphery of the sprocket wheel 20 and the cutting elements 25 fall into coacting notches or recesses 28 defined between cog-like sprockets 27 disposed around the periphery of the sprocket wheel. In the embodiment shown in FIGS. 4, 5, the guide means are comprised of a peripheral groove 26 that is formed in the apices of respective teeth or sprockets 27 and extending circumferentially around the sprocket wheel 20, said groove functioning to guide and support the wire loop 18 tensioned against the sprocket wheel 20 in the groove 26 between the walls of said groove, such that the central plane of the wire loop 18 will coincide with the central plane of the sprocket wheel 20 and the cutting elements 25, suspended by those parts of the wire loop 18 that bridge or span the recesses 28, will hang freely in said recesses. The sprocket wheel 20 thus makes no wearing contact with the cutting elements 25. In the case of the embodiment of the wire loop 18 shown in FIGS. 2, 3, the sprockets 27 drop in between the elastomeric material of the end-flanges 42 and thus make no wearing contact with the metal. Neither shall the saw guide bar 17 as such be in wearing metallic contact with the cutting elements 25. To this end, the wire loop 18 is tensioned so that the loop will hang freely at a safe distance from the saw guide bar 17 at those parts where sawing work can occur with a manually applied feeding force. As shown in FIG. 1, this applies suitably to the entire bottom run of the wire loop and a major part of the upper run of said loop outside the machine housing 15.

Since the wire or cable 40 of the wire loop 18 is twisted and joined to form a loop, preferably by splicing the mutually joined ends of the wire, the wire loop 18 will tend to twist about its longitudinal axis as it moves between the drive wheel and sprocket wheel. In the case of the circular cutting elements shown in FIGS. 5, 6, this tendency is an advantage that can be further amplified by angularly offsetting the mutually joined ends of the wire when splicing or otherwise joining said ends, e.g. with the aid of a screw connector, in relation to the longitudinal axis of the wire loop 18 so as to obtain a loop that has a figure-of-eight configuration prior to fitting the loop. The thus amplified twisting tendency alternates in relation to the saw guide bar 17, the outwardly facing, active cutting cylindrical parts of the cutting elements 25, so as to utilise the whole of the cylindrical surface, which as such must be wider than the saw blade 17, for sawing.

Figure 7:
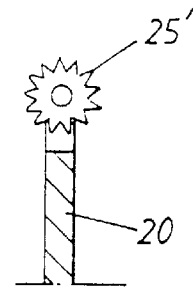
FIG. 7 is a sectional view similar to FIG. 5 and shows an alternative loop-carried cutting element for sawing wood.
Figure 8:
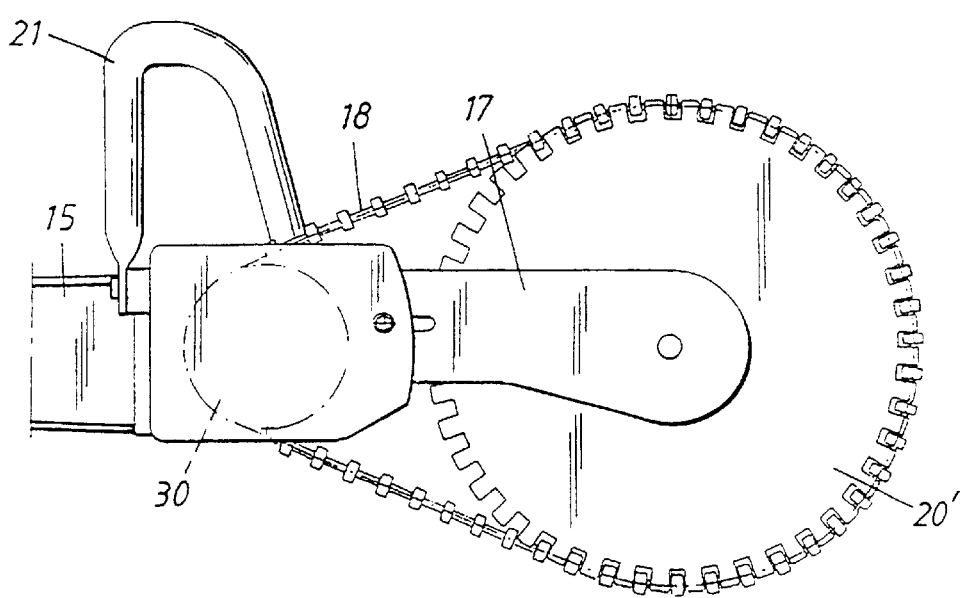
FIG. 8 illustrates a second embodiment of the inventive power saw that has the character of a circular saw carried by the saw blade.
Figure 9:
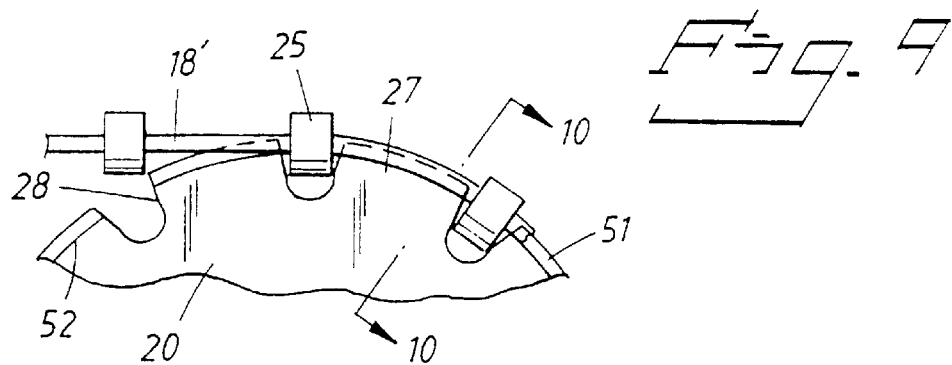
FIG. 9 is a side view of part of an alternative guide sprocket wheel for coaction with a cutting-element carrying double-wire loop.
Figure 10:
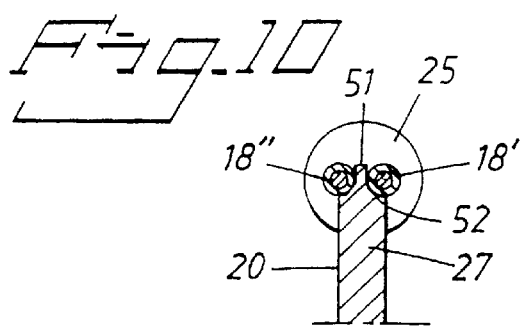
FIG. 10 is a sectional view taken on the line 10—10 in FIG. 9.
Figure 11:
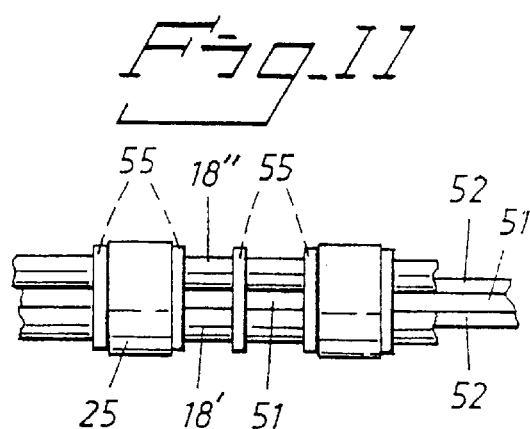
FIG. 11 is a view of the FIG. 9 embodiment from above.
Figure 12:
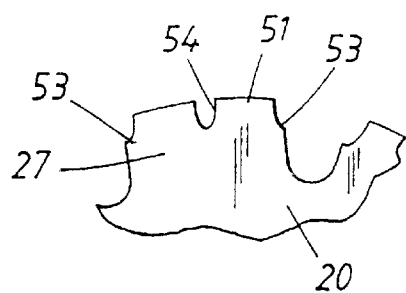
FIG. 12 is a side view showing part of a shape-variant of the sprockets or cogs on the guide sprocket wheel shown in FIG. 9.

The free-hanging wire loop 18 and its similarly freely-hanging rotary cutting elements 25 make it much easier for water flushed through passageways 47 (FIG. 1) to prevent the ingress of debris cuttings when cutting stone and to prevent clogging, wear and operational disturbances, e.g. disturbances caused by the wire loop skewing and leaving its guides. When sawing wood with one-sided alternative cutting elements, shown schematically in FIG. 7 and referenced 25' (provided with teeth, e.g. hard-metal teeth when necessary), the improved prevention of the ingress of sawdust and chips enables that the use of environmentally harmful oil, customarily supplied to the cutting elements in order to control blocking or clogging of the wood cut, can be omitted or at least greatly reduced. Furthermore, branches can be cut from a lying tree with a simple sideways movement of the free-hanging wire loop without needing to tilt the saw, since the cutting elements cut in all directions. In In the embodiment shown in FIG. 8, the wire loop 18 forms a geared transmission from the drive wheel 30 to a guide sprocket wheel 20' which is enlarged with respect to diameter. The saw therewith obtains the effect of a circular saw, e.g. for sawing angular cuts to a depth that can be extended beyond the centre of the sprocket wheel 20'.

FIGS. 9–12 illustrate alternative guiding of the wire loop 18 around the periphery of the guide sprocket wheel 20, in the form of a duplicated construction of the wire loop divided into two separate, mutually adjacent thin wire parts 18', 18", i.e. wires coated with elastomeric material, which commonly carry the cutting elements 25 therebetween. The guide devices on the periphery of the guide sprocket wheel 20 are formed by a central cog cam 51 on each sprocket 27 that projects in between the wire-parts 18', 18" and guides said line-parts into coplanar abutment with abutment surfaces 52 on respective sides of the cog cams 51. This replaces the groove 26 of the FIG. 5 embodiment. The wire loop 18', 18" is unable to twist in the case of this embodiment and the cutting elements can therewith freely be given an irregular shape, e. g. a pointed saw-tooth shape, with solely a one-sided outwardly cutting form. Duplication of the wire loop in the wire-parts 18', 18" also enables the guide sprocket-wheel to be made extremely thin and given the form of a flat and smoothly toothed disc 20, FIG. 12, mounted on a saw, guide bar, where the sprockets 27 with shoulders 53 and intermediate recesses 54 carry rungs 55 made of an elastomeric material or some other material and surrounding, joining and carrying the wire-parts 18', 18" hanging on respective sides of the tops 51 of the sprockets 27 during passage thereover with the common central plane of the wire-parts 18', 18" in plane with the guide sprocket wheel 27. The rungs 55 are indicated by broken reference lines in FIG. 11.

Figure 13:
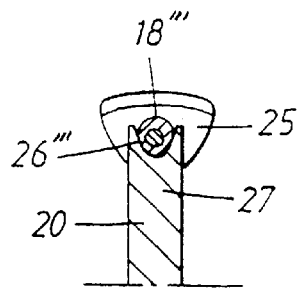
FIG. 13 is an enlarged view similar to the view of FIG. 5, showing a variant of the wire loop intended for one-sided sawing cutting elements that do not twist around the long axis of the loop.

In the embodiment shown in FIG. 13, the guide means of the guide sprocket wheel 20 has the form of a peripheral groove which receives the wire loop in shape-bound engagement. A wedge-shaped engagement between the groove 26''' and the wire loop 18''' is shown by way of example. This sort-of V-belt shaped engagement prevents the wire loop 18''' from twisting about its long axis, so as to make one-sided cutting possible, e.g. with the aid of a simple and irregularly shaped cutting element 25.

What is claimed is:

1. A hand-held motor-driven saw comprising:
   a machine housing with a handle,
   a drive motor having a drive wheel,
   a saw guide bar which projects out from the machine housing,
   a loop-guiding sprocket wheel having peripheral notches,
   a continuous wire loop which carries axially spaced cutting elements thereon, arranged to run around the saw guide bar between said drive wheel in the drive motor and said loop-guiding sprocket wheel at a free end of the saw guide bar,
   a cutting width of the cutting elements being greater than the width of the saw guide bar and of the guide sprocket wheel, and
   guide devices on the periphery of the sprocket wheel to maintain the wire loop in plane with the sprocket wheel as the wire loop runs around said sprocket wheel;
   wherein the cutting elements drop into coacting one of said notches which are provided in the periphery of the sprocket wheel between said guide devices so as to enable the cutting elements to hang freely in those parts of the wire loop that span the notches.

2. A saw according to claim 1, wherein peripheral parts of the sprocket wheel extending between the recesses form sprockets which function to direct the cutting elements freely-hanging into said recesses on the sprocket wheel as the wire loop runs around said sprocket wheel.

3. A saw according to claim 2, wherein said wire loop includes at least one wire comprised of mutually twisted steel strands.

4. A saw according to claim 3, wherein said cutting elements are mounted on a loop-carried steel carrier core; said cutting elements have applied thereto a hard stone-cutting abrasive layer for stone work; and a wire-section between said cutting elements is covered with an elastomeric material with end-flanges of the same material that lie against carrier cores and form side abutments upon contact with sprockets on the sprocket wheel.

5. A saw according to claim 2, wherein said guide devices are formed by a peripheral groove around the sprocket wheel formed in the tops of the sprockets.

6. A saw according to claim 2, wherein said wire loop is in shape-bound coaction with said sprockets in a to prevent twisting of the wire loop about its longitudinal axis whereby the cutting elements cut actively with constantly the same surfaces that lie distal from the saw guide bar.

7. A saw according to claim 3, wherein the wire loop is duplicated and divided into two separate, mutually adjacent wire-sections which carry the cutting elements commonly therebetween; and in that the guide devices are formed by said sprockets lying in the 30 central plane of the sprocket wheel and said wire-sections such as to prevent twisting of the wire-loop by penetration between said wire-sections whereby the cutting elements will cut actively with constantly the same surfaces that lie distal from the saw guide bar.

8. A saw according to claim 1 or 2, wherein the wire loop between the drive wheel and the sprocket wheel is tensioned to hang freely in relation to the saw guide bar with full clearance during a sawing operation, at least in the bottom run of the wire loop.

9. A saw according to any one of claims 1 to 5, wherein the wire loop forms a geared transmission from the drive wheel to a sawing-effective sprocket wheel whose diameter is enlarged in relation to the diameter of the drive wheel and with a circular-saw effect to a cutting depth beyond the rotational centre of the guide sprocket wheel.

10. A saw according to claim 1, wherein the cutting elements on the wire loop are cylindrical; ends of the wire loop are joined together in a manner such as to be offset angularly in relation to the longitudinal axis of the wire loop so that the wire loop will twist about its long axis during orbital movement and switch the outwardly facing, active cutting cylindrical parts of the cutting elements at the periphery; and the wire loop includes a wire comprised of mutually twisted steel that have been joined to form a loop.

* * * * *